US009148841B2

(12) United States Patent
Li et al.

(10) Patent No.: US 9,148,841 B2
(45) Date of Patent: Sep. 29, 2015

(54) METHODS AND APPARATUS FOR CORRECTING ERROR EVENTS ASSOCIATED WITH IDENTITY PROVISIONING

(71) Applicant: Apple Inc., Cupertino, CA (US)

(72) Inventors: Li Li, Cupertino, CA (US); Stephan V. Schell, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 192 days.

(21) Appl. No.: 13/762,897

(22) Filed: Feb. 8, 2013

(65) Prior Publication Data

US 2013/0210388 A1    Aug. 15, 2013

Related U.S. Application Data

(60) Provisional application No. 61/597,359, filed on Feb. 10, 2012.

(51) Int. Cl.
| | |
|---|---|
| *H04M 1/66* | (2006.01) |
| *H04W 48/06* | (2009.01) |
| *H04W 28/02* | (2009.01) |
| *H04W 52/02* | (2009.01) |
| *H04W 8/20* | (2009.01) |
| *H04W 12/12* | (2009.01) |

(Continued)

(52) U.S. Cl.
CPC .......... *H04W 48/06* (2013.01); *H04W 28/0289* (2013.01); *H04W 52/0212* (2013.01); *H04L 69/40* (2013.01); *H04W 8/20* (2013.01); *H04W 8/265* (2013.01); *H04W 12/12* (2013.01); *H04W 28/06* (2013.01); *H04W 74/004* (2013.01)

(58) Field of Classification Search
CPC ..... H04W 4/02; H04W 12/12; H04L 63/0272
USPC .......... 455/414.1, 67.7, 422.1, 410, 406, 411, 455/405; 370/338, 328, 329; 726/4, 6, 1, 26
See application file for complete search history.

(56) References Cited

U.S. PATENT DOCUMENTS

| | | |
|---|---|---|
| 6,789,203 B1 | 9/2004 | Belissent |
| 2006/0256760 A1 | 11/2006 | Patrick et al. |

(Continued)

FOREIGN PATENT DOCUMENTS

| | | |
|---|---|---|
| WO | 2009103622 | 8/2009 |
| WO | WO2010148344 | 12/2010 |
| WO | 2011057668 | 5/2011 |

OTHER PUBLICATIONS

PCT Application No. PCT/US2013/025397—International Search Report and Written Opinion dated Sep. 17, 2013.

(Continued)

*Primary Examiner* — Kiet Doan
(74) *Attorney, Agent, or Firm* — Downey Brand LLP (57) ABSTRACT

Methods and apparatus for correcting error events associated with identity provisioning. In one embodiment, repeated requests for access control clients are responded to with the execution of a provisioning feedback mechanism which is intended to prevent the unintentional (or even intentional) over-consumption or waste of network resources via the delivery of an excessive amount of access control clients. These provisioning feedback mechanisms include rate-limiting algorithms and/or methodologies which place a cost on the user. Apparatus for implementing the aforementioned provisioning feedback mechanisms are also disclosed and include specialized user equipment and/or network side equipment such as a subscriber identity module provisioning server (SPS).

20 Claims, 3 Drawing Sheets

(51) Int. Cl.
*H04L 29/14* (2006.01)
*H04W 8/26* (2009.01)
*H04W 28/06* (2009.01)
*H04W 74/00* (2009.01)

(56) References Cited

U.S. PATENT DOCUMENTS

2007/0111666 A1* 5/2007 Waxman .................. 455/67.7
2007/0177562 A1 8/2007 Castrogiovanni et al.
2007/0226229 A1* 9/2007 Psounis et al. .................. 707/10
2010/0197281 A1* 8/2010 Bennett et al. ............. 455/414.1
2011/0136482 A1 6/2011 Kaliner
2011/0238738 A1 9/2011 Wu et al.
2011/0265158 A1 10/2011 Cha et al.

OTHER PUBLICATIONS

Taiwanese Patent Application No. 102105373—Office Action dated Aug. 15, 2014.

* cited by examiner

METHODS AND APPARATUS FOR CORRECTING ERROR EVENTS ASSOCIATED WITH IDENTITY PROVISIONING

PRIORITY AND RELATED APPLICATIONS

This application claims priority to U.S. Provisional Patent Application Ser. No. 61/597,359 filed on Feb. 10, 2012 and entitled "METHODS AND APPARATUS FOR CORRECTING ERROR EVENTS ASSOCIATED WITH IDENTITY PROVISIONING", the foregoing being incorporated herein by reference in its entirety.

This application is related to co-owned, U.S. Provisional Patent Application Ser. Nos. 61/596,007 filed on Feb. 7, 2012 and entitled "NETWORK ASSISTED FRAUD DETECTION APPARATUS AND METHODS", and co-owned, co-pending U.S. patent application Ser. No. 13/109,851 filed on May 17, 2011 and entitled "METHODS AND APPARATUS FOR ACCESS CONTROL CLIENT ASSISTED ROAMING", Ser. No. 13/079,614 filed on Apr. 4, 2011 and entitled "MANAGEMENT SYSTEMS FOR MULTIPLE ACCESS CONTROL ENTITIES", Ser. No. 13/111,801 filed on May 19, 2011 and entitled "METHODS AND APPARATUS FOR DELIVERING ELECTRONIC IDENTIFICATION COMPONENTS OVER A WIRELESS NETWORK", Ser. No. 13/080,521 filed on Apr. 5, 2011 and entitled "METHODS AND APPARATUS FOR STORAGE AND EXECUTION OF ACCESS CONTROL CLIENTS", Ser. No. 13/078,811 filed on Apr. 1, 2011 and entitled "ACCESS DATA PROVISIONING APPARATUS AND METHODS", Ser. No. 13/080,533 filed on Apr. 5, 2011 and entitled "SIMULACRUM OF PHYSICAL SECURITY DEVICE AND METHODS", Ser. No. 13/287,874 filed on Nov. 2, 2011 and entitled "METHODS AND APPARATUS FOR ACCESS DATA RECOVERY FROM A MALFUNCTIONING DEVICE", Ser. No. 13/294,631 filed on Nov. 11, 2011 and entitled "APPARATUS AND METHODS FOR RECORDATION OF DEVICE HISTORY ACROSS MULTIPLE SOFTWARE EMULATIONS", and Ser. No. 12/952,082 filed on Nov. 22, 2010 and entitled "WIRELESS NETWORK AUTHENTICATION APPARATUS AND METHODS", Ser. No. 12/952,089 filed on Nov. 22, 2010 and entitled "APPARATUS AND METHODS FOR PROVISIONING SUBSCRIBER IDENTITY DATA IN A WIRELESS NETWORK", Ser. No. 13/183,023 filed on Jul. 14, 2011 and entitled "VIRTUAL SUBSCRIBER IDENTITY MODULE DISTRIBUTION SYSTEM", Ser. No. 13/093,722 filed on Apr. 25, 2011 and entitled "APPARATUS AND METHODS FOR STORING ELECTRONIC CLIENTS", Ser. No. 13/080,558 filed on Apr. 5, 2011 and entitled "APPARATUS AND METHODS FOR CONTROLLING DISTRIBUTION OF ELECTRONIC ACCESS CLIENTS", and Ser. No. 13/095,716 filed on Apr. 27, 2011 and entitled "APPARATUS AND METHODS FOR DISTRIBUTING AND STORING ELECTRONIC ACCESS CLIENTS", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of Use

The present disclosure relates generally to wireless systems such as, for example, systems in which devices communicate using cellular networks. More particularly, embodiments are directed to, inter alia, methods and apparatus for detection and correction of error events on cellular networks.

2. Description of Related Technology

Access control is required for secure communication in most prior art wireless radio communication systems. As an example, one simple access control scheme might comprise: (i) verifying the identity of a communicating party, and (ii) granting a level of access commensurate with the verified identity. Within the context of an exemplary Universal Mobile Telecommunications System (UMTS) cellular system, access control is governed by an access control client, typically referred to as a Universal Subscriber Identity Module (USIM) which is embodied within a physical card form factor Universal Integrated Circuit Card (UICC). During operation, the USIM contained within the UICC authenticates the subscriber to the cellular network. After successful authentication, the subscriber is allowed access to the cellular network.

Each USIM card is associated with a single user account, where the user account data is permanently stored on the SIM card. The user account data is also stored on the network side of a cellular system. Occasionally, errors can occur where the user account data stored on the UICC does not match the user account data stored on the carrier's backend billing or other information storage system. In these instances, the SIM data located on the user's mobile device will be unable to authenticate itself to the cellular network. These errors can occur for any number of reasons, but typically result from a data entry error (a so-called "fumble fingers" error) by the network operator, such as upon establishing the user's initial subscription or account.

For example, anecdotal data suggests that point-of-sale agents occasionally mistype subscriber data while initializing a new subscriber (e.g., subscriber information, card information, billing information, etc.). These types of mistakes can manifest in a myriad of different ways; however, the most convenient remedy is typically to issue the user a replacement USIM from the network operator.

More recently, the physical Universal Integrated Circuit Card (UICC) of the prior art has been replaced with an access client that is emulated as a virtual or electronic entity, hereafter referred to as an Electronic Universal Integrated Circuit Card (eUICC). The eUICC is contained within a secure element (e.g., secure microprocessor or storage device) in the UE. The eUICC is capable of storing and managing one or more SIM elements, referred hereafter as Electronic Subscriber Identity Module(s) (eSIM). Each eSIM contains the same data of a typical USIM. The eUICC selects an eSIM based upon the eSIM ICC-ID. Once the eUICC selects the desired eSIM, the user device (e.g., UE) can initiate an authentication procedure to obtain wireless network services from the eSIM's corresponding network operator.

The use of eSIMs presents a unique problem to network operators. In the past, the use of physical SIM cards provided some level of tangible feedback (the agent can appreciate the limited inventory of the physical SIM card) to both users and network operators. When error events occurred, or a new USIM was otherwise needed, a new physical SIM card had to be provisioned. Such provisioning of a customer with a new physical SIM card consumed card from a limited sales inventory, thereby encouraging agents of the network operator to use care when adding new subscribers (lest they have to repeat their efforts, incur the cost of sending the new SIM to the user, etc.).

While eSIM's are no longer embodied in a physical form, they still occupy network operator resources when provisioned. Unfortunately, the virtualized eSIM no longer provides the tangible feedback to a user or an employee of a network provider that a physical SIM card otherwise would. Therefore, improved methods and apparatus are required for providing feedback to electronic identity provisioning so that resources are not unintentionally (or intentionally) wasted. Ideally, such solutions would be transparent or otherwise minimally intrusive to a user, thereby maximizing the user's experience with electronic identity provisioning.

SUMMARY

The present disclosure satisfies the aforementioned needs by providing, inter alia, improved apparatus and methods for providing provisioning feedback mechanisms during the delivery of access control clients such as e.g., eSIMs.

A method of executing a provisioning feedback mechanism is disclosed. In one embodiment, the provisioning feedback mechanism is executed by receiving a request for an access control client, providing the access control client in response to the received request, receiving an additional request for the access control client and executing the provisioning feedback mechanism in response to the additional request.

A method of limiting provisioning is also disclosed. In one embodiment, the provisioning limiting includes receiving a request for an access control client, providing the access control client in response to the received request, receiving an additional request for the access control client, and limiting provision of further access control clients in response to the additional request.

A method of providing provisioning feedback is further disclosed. In one embodiment, the provisioning feedback is provided by receiving a request for an access control client, providing the access control client in response to the received request, receiving an additional request for the access control client, and providing the provisioning feedback in response to the additional request.

Systems for use with the aforementioned provisioning feedback mechanism are additionally disclosed.

Business methods and paradigms for use with the aforementioned provisioning feedback mechanism are additionally disclosed.

A method of provisioning access control to a mobile device is further disclosed. In one embodiment, the method may include sending a first request for a first electronic Subscriber Identity Module (eSIM), disabling an ability to send a second request for a second eSIM when an amount of requests for eSIMs exceeds a threshold, and after an amount of time elapses, enabling the ability to send the second request for the second eSIM.

An apparatus is also disclosed. In one embodiment, the apparatus includes a wireless interface, a processor in data communication with the wireless interface, and a computer readable apparatus having a non-transitory storage medium with at least one computer program stored thereon, the at least one computer program configured to, when executed, cause the apparatus to: receive a plurality of requests for one or more access control clients from a mobile device, determine a first frequency of the plurality of requests over a first period of time, and restrict an ability to process at least of portion of the received plurality of request when the determined frequency exceeds request threshold.

An access client provision server is further disclosed. In one embodiment, the server includes a modem, a processor, and a computer readable apparatus having a storage medium. The storage medium includes at least one computer program stored thereon, the at least one computer program configured to, when executed on the processor: receive a request from a user to obtain multiple access control clients, each of the multiple access control clients enabling the user access to a different network operator, obtaining the multiple access control clients, receive a request from the user to return a first access control client of the multiple access control clients, and return the first access control client, allowing the first access control client to be obtained by a different user. In one variant, the computer program may be further configured to, in response to the return of the first access control client, credit an account of the user.

A device is also disclosed. In one embodiment, the device includes a network interface configured to communicate with a network, a network interface configured to communicate with a network, and computerized logic in data communication with the network interface, the logic at least configured to: request an access control client via the network interface, receive an access control client, verify the access control client, request at least one other access control client, an limit the quantity of requests of the at least one other access control client.

An access control client provisioning server is also disclosed. In one embodiment, the server includes a network interface, a processor, and a computer readable apparatus having a storage medium. The storage medium includes at least one computer program stored thereon, the at least one computer program configured to, when executed on the processor: receive a request for a first access control client for a mobile device, verifying the request to ensure the request is received from an authorized entity, provide, via the network interface, the access control client, receive a request for a second access control client for the mobile device, and execute a provisioning feedback mechanism in response to the received request for the second access control client.

A provisioning server is further disclosed. In one embodiment, the server includes an interface to communicate with requesting devices, computerized logic in data communication with the interface, the logic at least configured to: receive a first request for a first access control client, provide the first access control client, provide a time window of an additional access control client, receive a second request for the additional access control client, provide the additional access control client when the second request was within the time window, and deny the additional access control client when the second request was outside the time window.

Other features and advantages of the present disclosure will immediately be recognized by persons of ordinary skill in the art with reference to the attached drawings and detailed description of exemplary embodiments as given below.

All Figures© Copyright 2012-2013 Apple Inc. All rights reserved.

DETAILED DESCRIPTION

Reference is now made to the drawings, wherein like numerals refer to like parts throughout.

Overview

In one salient embodiment, the present disclosure provides for provisioning limiting or feedback during the provisioning of an access control client (such as an eSIM) in a wireless network. In one embodiment, repeated requests for access control clients are responded to with the execution of a provisioning feedback mechanism which is intended to prevent the unintentional (or even intentional) over-consumption of network resources via the delivery of an excessive amount of access control clients. This is accomplished in any number of ways, including for example by rate-limiting the number of requests, and/or the number of responses made to these requests, so as to prevent the requester from, inter alia, inadvertently downloading a large number of access control clients when a user otherwise actually intends to only acquire a single access control client. In another embodiment, a cost or other penalty is imposed on the requester, such as by imposing a fee for each unnecessary or repetitive request made.

Exemplary rate-limiting algorithms useful with various embodiments include exponential backoff algorithms, geometric backoff algorithms, single request paradigms, and other types of algorithm effective in preventing the overconsumption of access control client data.

The rate-limiting algorithms of the provisioning feedback mechanism are, in an exemplary embodiment, executed on the server side of the network. Alternative embodiments are executed on the client side of the network, while yet other embodiments implement the rate-limiting algorithm at an intermediary entity located between the network operator and the client device. As yet another variant, network- and client-side algorithms may work in a cooperative or distributed fashion.

Apparatus for implementing the aforementioned provisioning feedback mechanisms are also disclosed, and in various embodiments may include specialized user equipment and/or network side equipment such as a subscriber identity module provisioning server (SPS).

DETAILED DESCRIPTION OF EXEMPLARY EMBODIMENTS

Exemplary embodiments of the present disclosure are now described in detail. While these embodiments are primarily discussed in the context of Subscriber Identity Modules (SIMs) of a GSM, GPRS/EDGE, or UMTS cellular network, it will be recognized by those of ordinary skill that the present disclosure is not so limited. In fact, the various embodiments are useful in any wireless network (whether cellular or otherwise) that can benefit from the execution of a provisioning feedback mechanism for access control entities or clients.

It will also be recognized that while the term "subscriber identity module" (SIM) is used herein (e.g., eSIM), this term in no way necessarily connotes or requires either (i) use by a subscriber per se (i.e., embodiments may be practiced by a subscriber or non-subscriber); (ii) identity of a single individual (i.e., embodiments may be practiced on behalf of a group of individuals such as a family, or intangible or fictitious entity such as an enterprise); or (iii) any tangible "module" equipment or hardware.

Prior Art Subscriber Identity Module (SIM) Operation—

Within the exemplary context of prior art UMTS cellular networks, a user equipment (UE) includes a mobile device and a Universal Subscriber Identity Module (USIM). The USIM is a logical software entity that is stored and executed from a physical Universal Integrated Circuit Card (UICC). A variety of information is stored in the USIM such as subscriber information, as well as the keys and algorithms used for authentication with the network operator in order to obtain wireless network services.

Generally, UICCs are programmed with a USIM prior to subscriber distribution; the pre-programming or "personalization" is specific to each network operator. For example, before deployment, the USIM is associated with an International Mobile Subscriber Identify (IMSI), a unique Integrated Circuit Card Identifier (ICC-ID) and a specific authentication key (K). The network operator stores the association in a registry contained within the network's Authentication Center (AuC). After personalization, the UICC can be distributed to subscribers.

Figure 1:
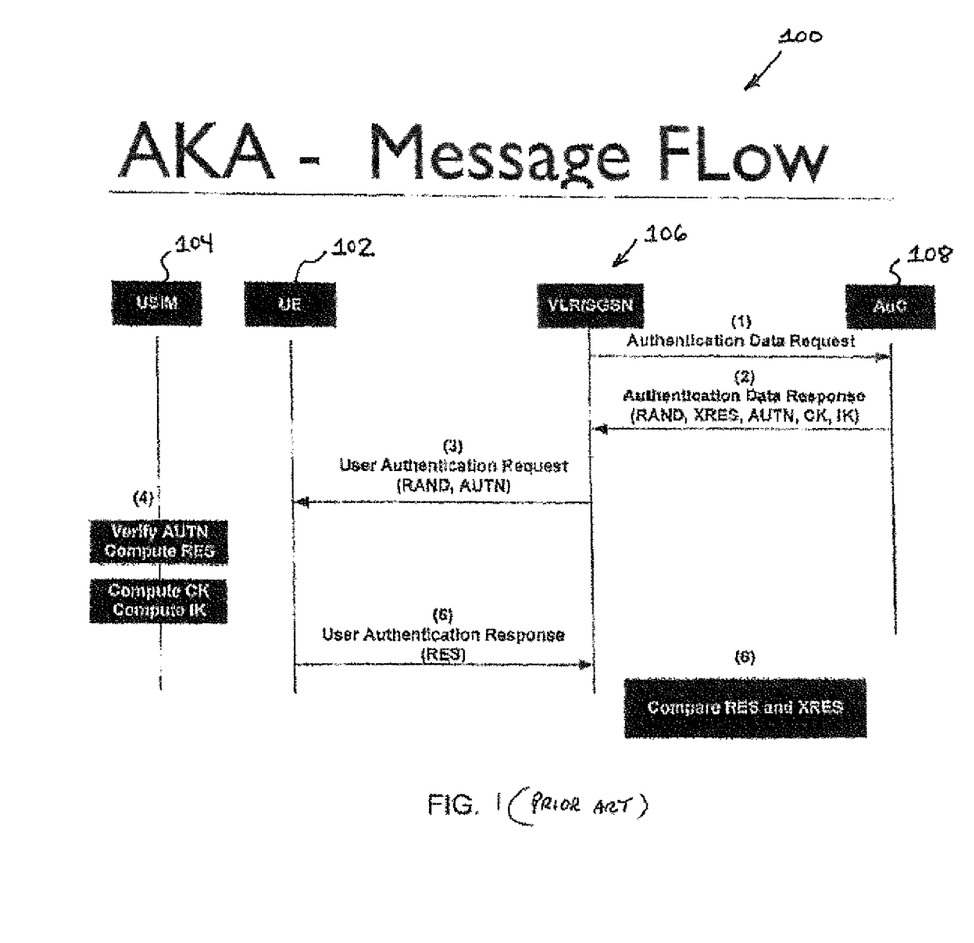
FIG. 1 is a logical ladder diagram illustrating a prior art Authentication and Key Agreement (AKA) procedure using a Subscriber Identity Module (SIM).

Referring now to FIG. 1, one exemplary Authentication and Key Agreement (AKA) procedure 100 using the aforementioned prior art USIM is illustrated in detail. During normal authentication procedures, the UE 102 acquires the International Mobile Subscriber Identifier (IMSI) from the USIM 104. The UE passes it to the Serving Network (SN) 106 of the network operator or the visited core network. The SN forwards the authentication request (1) to the AuC 108 of the Home Network (HN). The HN compares the received IMSI with the AuC's registry and obtains the appropriate K. The HN generates a random number (RAND) and signs it with K using an algorithm to create the expected response (XRES). The HN further generates a Cipher Key (CK) and an Integrity Key (IK) for use in cipher and integrity protection as well as an Authentication Token (AUTN) using various algorithms. The HN sends an authentication data response/vector (2), consisting of the RAND, XRES, CK, and AUTN to the SN. The SN stores the authentication vector only for use in a one-time authentication process. The SN passes the RAND and AUTN to the UE in a user authentication request (3). Once the UE 102 receives the RAND and AUTN, the USIM 104 verifies if the received AUTN is valid. If so, the UE uses the received RAND to compute its own response (RES) using the stored K and the same algorithm that generated the XRES. The UE passes the RES back to the SN with a user authentication response (5). The SN 106 compares the XRES to the received RES and if they match, the SN authorizes the UE to use the operator's wireless network services.

Methods—

In the context of an exemplary implementation, instead of using a physical UICC as in the prior art, the UICC is emulated as a virtual or electronic entity such as e.g., a software application, hereafter referred to as an Electronic Universal Integrated Circuit Card (eUICC), that is contained within a secure element (e.g., secure microprocessor or storage device) in the UE. The eUICC is capable of storing and managing multiple USIM elements, referred hereafter as Electronic Subscriber Identity Modules (eSIMs). Each eSIM contains the same data as a typical USIM. The eUICC selects an eSIM based upon the eSIM's ICC-ID. Once the eUICC selects the desired eSIM(s), the UE can initiate an authentication procedure to obtain wireless network services from the eSIM's corresponding network operator. As described herein, because electronic identity data is no longer embodied on a physical card, deploying a new electronic identity data to a customer's user equipment is substantially simplified, thereby inter alia consuming less time and resources.

Figure 2:
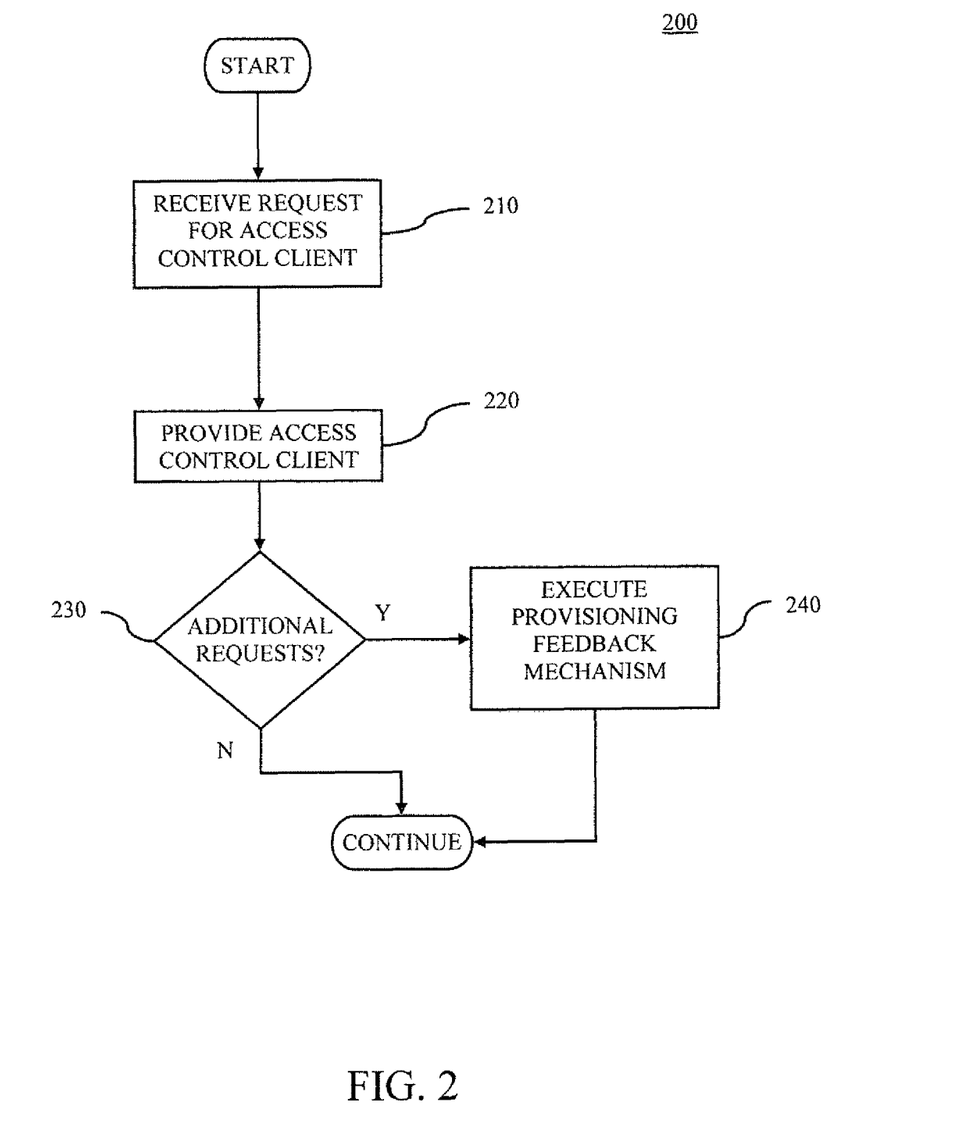
FIG. 2 is a logical flow diagram detailing one exemplary embodiment for executing a provisioning feedback mechanism according to an embodiment.

Referring now to FIG. 2, one embodiment of a generalized method 200 for executing a provisioning feedback mechanism during the provisioning of an access control client is described. In one exemplary implementation, the provisioning system comprises providing each wireless (e.g., cellular) user equipment with a unique device key and endorsement certificate which can be used to provide updates or new eSIMs to the user equipment in the "field", such as for instance that described in co-owned U.S. patent application Ser. No. 13/080,521 filed on Apr. 5, 2010 and entitled "METHODS AND APPARATUS FOR STORAGE AND EXECUTION OF ACCESS CONTROL CLIENTS", the contents of which were previously incorporated by reference in its entirety. The user equipment can trust eSIM material delivered by an unknown third-party eSIM vendor, based on the secure certificate transmission with the device key.

At step 210 of the method 200, a request for an access control client is received. In one embodiment, the user of a mobile device (e.g., UMTS UE) requests an access control client from a third-party access control client vendor. The received request can result from any number of operational contexts. For example, in one exemplary context, the request is made in response to a user's attempt to authenticate a newly purchased smart phone to a network operator for the first time. One such exemplary implementation of an initialization request is described in the aforementioned co-owned U.S. patent application Ser. No. 13/080,521 filed on Apr. 5, 2010 and entitled "METHODS AND APPARATUS FOR STORAGE AND EXECUTION OF ACCESS CONTROL CLIENTS", the contents of which were previously incorporated herein by reference in its entirety.

In another context, the request can result from an error event experienced by a user, such as a user's mobile device failing to authenticate to a cellular network using a previously acquired access control client. As a result of this error, a subsequent request to obtain a new replacement access control client data is made. This subsequent request is, in an exemplary embodiment, manually initiated by a user of a mobile device via the selection of an icon on a user's graphical user interface. For example, the mobile device's graphical user interface can be configured to display a selectable button for getting a new eSIM whenever an existing eSIM fails to authenticate to the network. The user can then request the new eSIM by selecting the displayed button. Alternatively, the request made in response to the authentication failure will be executed automatically by the UE, thus making the additional request(s) transparent to the user of the UE.

At step 220, the requested access control client (e.g., an eSIM) is provided to the requestor or requesting entity. Exemplary methods and apparatus useful for the delivery of access control clients consistent with the present disclosure is described in co-owned U.S. patent application Ser. No. 13/111,801 filed May 19, 2011 and entitled "METHODS AND APPARATUS FOR DELIVERING ELECTRONIC IDENTIFICATION COMPONENTS OVER A WIRELESS NETWORK", the contents of which are incorporated herein by reference in its entirety. The access control client can either be provided via the cellular network itself, or via an alternative network interface or medium. For example, as described therein, a previously purchased or deployed wireless apparatus can be activated by a cellular network, and download operating system components and/or access control client components, such as from an Internet broadband connection, a temporarily provisioned cellular channel or link, or even WLAN or short range (e.g., NFC) communication with a provisioning device (such as in a storefront of the service provider or equipment provider).

However, the foregoing ease of requesting a new eSIM can be potentially abused. Anecdotally, it is not unusual for users to repeatedly request randomized numbers so as to suit an arbitrary preference (e.g., it is believed that some users will repeatedly request an eSIM until they see a "lucky" number, or a recognizable pattern or easily remembered sequence of numbers, etc.). Similarly, point-of-sale agents may not realize that requesting a replacement eSIM actually depletes the number of available eSIMs (without a tangible card, the agent may wrongly assume that generating new eSIMs is a trivial or unbounded process). Since each eSIM is associated with one (1) unique account of a limited population of such accounts, wasting eSIMs in this manner is highly undesirable.

It will be appreciated, however, that in certain contexts (such as where the recycle or re-provisioning time associated with such "wasted" eSIMs is limited or predictable), it may be desirable to implement embodiments in more of a "throttling" manner than an absolute one. Accordingly, under varying embodiments, provisioning feedback as described herein may be applied in anything ranging from a complete denial of provisioning further eSIMs after a criterion (e.g., threshold number or rate) is reached, to merely limiting the rate at which such repetitive provisioning can occur (e.g., so as to not allow the pool of available eSIMs to dwindle or be undesirably depleted).

At step 230, it is determined whether "excessive" additional requests for access control clients are being received, and if so, a provisioning feedback mechanism is executed at step 240. The primary goal of the provisioning feedback mechanism is to prevent the unintentional (or even intentional) wasting of network resources via the delivery of an excessive amount of access control clients. In one exemplary embodiment, the provisioning feedback mechanism will rate-limit the number of requests, and/or the number of responses made to these requests, so as to prevent the requester from, inter alia, inadvertently downloading a large number of access control clients when a user otherwise actually intends to only acquire a single access control client. The rate-limiting algorithm can be implemented in any number of ways but would, in an exemplary embodiment, allow the requester to make a limited number, e.g., one free request (e.g. step 210) and prohibit subsequent attempts for a given amount of time. For example, the use of an exponential backoff algorithm can be implemented in some embodiments in order to space out repeated requests for access control clients. Other techniques such as geometric backoff algorithms could also be deployed with the desirability of such a choice being readily apparent to one of ordinary skill given the present disclosure. As yet another option, a randomized backoff can be used, such that one requesting user/device is randomly assigned a first backoff interval, and a second user/device a second interval, such that the population of requesting users/devices as a whole complies with a desired statistical or other distribution or criterion.

In yet another alternative embodiment, the requester is limited to a fixed number of access control client requests. For example, the requester might be limited to making a single request per carrier. The choice of the specific feedback provisioning feedback mechanism chosen may be governed by the manufacturer of the user equipment (UE) device or by some other entity such as the network operator.

As yet a further alternative, the rate limiting algorithm is tied to the replenishment or recycle rate, such that the available pool of eSIMs for provisioning never meets or exceeds a threshold criterion (e.g., low water mark).

As still another alternative, certain provisioning resource "windows" can be established, such that provisioning requests not falling within an available window are merely ignored. For example, a given client may only be given a short duration of time to request replacement provisioning; hence, physically only so many provisioning requests can be accomplished during such a short duration.

The rate-limiting algorithms of the provisioning feedback mechanism are, in one exemplary implementation, executed on the server side of the network. Specifically, an entity located on the server side of the network will ignore repeated requests in accordance with the aforementioned rate-limiting algorithms. In an exemplary implementation discussed subsequently herein, the entity executing the provisioning feedback mechanism will be a SIM (Subscriber Identity Module) provisioning server (SPS), such as for example that described in co-owned U.S. patent application Ser. No. 13/078,811 filed Apr. 1, 2011 and entitled "ACCESS DATA PROVISIONING APPARATUS AND METHODS", the contents of which are incorporated herein by reference in its entirety. Executing the provisioning feedback mechanism on the server side of the network has desirable security advantages, including that the server side of the network is presumably physically secure. Furthermore, as the SPS provides for the delivery of the eSIMs, it provides for a convenient architectural location for the execution of the provisioning feedback mechanism on a broader scale (e.g., network-wide or region-wide) if desired. Moreover, the client device population can be somewhat simpler, since it need not include the logic (e.g., algorithms) for implementing provisioning limiting/feedback mechanisms.

In an alternative implementation, the provisioning feedback mechanism is implemented on the client side of the network. In such an implementation, the client software will prohibit the device from making repeated requests by e.g., rate-limiting the provisioning requests made by the device. Client side implementations are advantageous in that they inherently reduce the amount of traffic that would otherwise travel on the network. In other words, if a client side device is rate limited from making further requests of, for example, an SPS, then the amount of traffic that occurs as a result of these requests also is rate limited. This can also reduce battery consumption on the client (mobile) device, since repeated radio frequency transmissions are obviated.

In yet another alternative implementation, the provisioning feedback mechanism is implemented at an intermediary entity located between the network operator and the client device. For example, a management application that is used by the user to manage the acquisition and purchase of access control clients could implement the provisioning feedback mechanisms described herein.

As yet another alternative, various of the functions necessary for implementing provisioning limiting/feedback mechanisms can be distributed or shared between network-side, client side, and/or intermediary entities. For instance, in one such implementation, data regarding the provisioning request activity of a certain mobile device can be assembled and transmitted to the network side entity (or intermediary entity) for further processing (including for example aggregation with data from other mobile devices). Where undesirable (e.g., abusive or surreptitious) provisioning request activity is occurring, the network or intermediary entity may "blacklist" the device from further provisioning requests until one or more remedial criterion are met.

As an alternative to the rate limiting feedback schemes discussed previously herein, another embodiment of the provisioning limiting/feedback mechanism places a cost or other penalty on the requester of the access control client. This cost or penalty can be used either independently of, or in conjunction with, the rate limiting schemes described above. As one example implementation, the requester is charged a flat fee (e.g. $0.25 per eSIM) in order to download the identity data, regardless of whether or not the requester ever actually activates the downloaded identity data. Alternatively, the fee or penalty may be non-linear (e.g., increases exponentially or according to some other relationship as a function of the number of requests made, and/or the rate at which the requests are made, such as where a user who slowly makes repeated requests over a longer duration is charged less for each additional request than one making the same number of requests in a shorter duration).

It will be appreciated that as used herein, the terms "cost" and "penalty" are to be broadly construed to include, without limitation, both monetary and non-monetary forms of consideration, including for instance reductions of previously provided incentives or services/privileges, limitations on use or functionality (e.g., imposition of data throttling or GB limits, service only during reduced time periods, etc.), place in a queue or waiting list for new services or features, etc. In sum, the disclosure contemplates where the user or device will be less "well off" in some respect by virtue of having made repeated (presumably unnecessary) requests for provisioning.

To this end, the user may also be advised immediately (such as via a pop up or other message on their display device) of the charges that are being accrued for repeated requests. In one such variant, the client device is configured to include an application which presents the user with warnings or requires affirmative acknowledgement of the costs associated with the request before the request can actually be sent. For instance, a multi-step process which (i) informs the user that a charge will be accrued, and (ii) makes the user confirm the request in a separate subsequent step, may be employed to effectively limit the rate at which requests can physically be made, so as to mitigate the user "machine gunning" the keys repeatedly in frustration.

It will further be appreciated, however, that mechanisms for determining the reason for or type of provisioning request may also be employed in evaluating whether to implement the foregoing limiting/feedback/cost mechanisms. For example, in one alternate implementation, if it is determined that the reason for the repeated provisioning requests is valid (e.g., a defect in the user equipment precluded the provisioned eSIMs from being used, or the provided eSIMs were somehow defective, or the service provider's interposed network was interfering with the activation process), then credit or lack of cost/penalty can be applied for that user.

Additionally, in another embodiment, the user may also be incentivized to return unused access control clients by offering a refund or other payment incentive so that a given access control client can be recycled and placed back into the access control client pool for reuse. For example, a user frustrated with the speed at which an access control client is acquired, may accidentally (or intentionally) make multiple requests that result in a large number of acquired access control clients along with resultant charges for each of these requests. The user, realizing his or her error, can subsequently return these unused access control clients and recover either a full or partial refund.

Specific implementation examples of the generalized methodology of FIG. 2 will now be described in detail.

Example #1

A user purchases a new mobile device that implements eSIM provisioning. Upon attempting to activate their new mobile device to the network, the authentication mechanism (e.g. FIG. 1) fails. A software application running on the user's mobile device recognizes the authentication problem as being a faulty eSIM, and displays to the user an option to obtain a new eSIM to replace the faulty eSIM. The user indicates that they wish to obtain a new eSIM, and responsively a request is sent to the SPS to service the request.

In this example, the user (who is now growing frustrated with the fact that the mobile device was unable to initially authenticate to the network) repeatedly makes requests for electronic identity data. For example, a user might initiate a request for electronic identity data over a graphical user interface (e.g. a touch screen, etc.). If the request for the electronic identity data isn't immediately responded to, the requester may continue to make additional requests (such as by repeatedly pushing 'enter' on a user's keyboard or repeatedly pushing 'get new eSIM' on a user's touch screen). The user could also believe that the mobile device is not operating as intended; i.e., is taking to long to provision new identity data, and repeatedly make requests in an attempt to get the mobile device to more quickly authenticate to the network.

Upon receipt of the initial request for the new eSIM, the SPS will start a timer which while running, which prevents the user from requesting and receiving additional eSIMs. Accordingly, the repeated requests by the user are ignored by SPS after receipt of the initial request. Once the timer expires the user is again able to request and receive additional eSIMs if desired, such as if the subsequent eSIM received also fails during the execution of the AKA procedure described with respect to FIG. 1 supra. The user may also be presented with a message on the user's mobile device indicating that the device is in the process of receiving the new eSIM and would, for example, display a progress indicator to let the user know that the device is functioning normally and that the user does not need to make additional requests.

Example #2

A user purchases a new mobile device that implements eSIM provisioning. Upon learning that a management application (such as the exemplary iTunes™ application offered by the Assignee hereof), offers a number of different voice and data plans among various network operators (along with their associated access control clients), the user decides to obtain multiple ones of these access control clients. For example, a user who resides in San Jose, Calif. but makes frequent trips to Europe and Asia for business may wish to acquire respective eSIMs for these different countries. The user will be charged a given fee, which may vary by carrier and/or plan, to acquire these eSIMs via the aforementioned management application. At a later time, the user's travel habits change (e.g., obtaining a new position, changing companies, etc.) such that the previously acquired access control clients are no longer relevant for that particular user. The user may then choose to return the previously acquired access control clients so that they may be recycled and reused by another user, such as by logging into their respective management application account and either selling or receiving credits for the returned access control client data. If the user chooses to receive credits, the user may use these credits to acquire other access control clients or alternatively, may use these credits to purchase other goods and services (such as music and/or video content) offered by the management application.

Exemplary Mobile Apparatus

Figure 3:
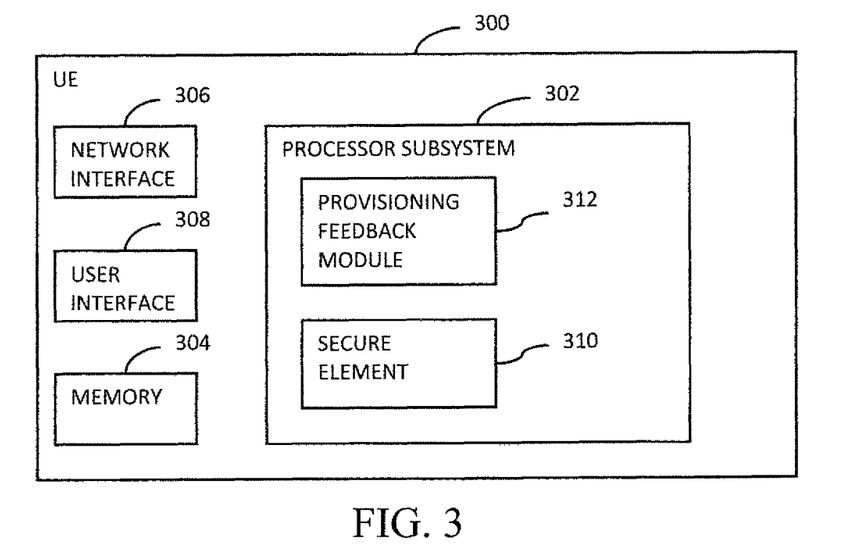
FIG. 3 is a block diagram illustrating an exemplary embodiment of a user device configured to implement provisioning feedback according to an embodiment.

Referring now to FIG. 3, exemplary apparatus 300 useful for implementing the methods of the present disclosure is illustrated.

The exemplary UE apparatus of FIG. 3 is a wireless device 300 with a processor subsystem 302 such as a digital signal processor, microprocessor, field-programmable gate array, or plurality of processing components mounted on one or more substrates. The processing subsystem may also comprise an internal cache memory. The processing subsystem is connected to a memory subsystem 304 comprising memory which may for example, comprise SRAM, flash and SDRAM components. The memory subsystem may implement one or a more of DMA type hardware, so as to facilitate data accesses as is well known in the art. The memory subsystem contains computer-executable instructions which are executable by the processor subsystem.

In one exemplary embodiment, the device comprises one or more network interfaces 306 adapted to connect to, for example, one or more wireless networks. The multiple wireless interfaces may support different radio technologies such as GSM, CDMA, UMTS, LTE/LTE-A, WiMAX, WLAN, Bluetooth, etc. by implementing the appropriate antenna and modem subsystems.

The user interface subsystem 308 includes any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card-type client embodiments (such as a "connect card") or universal serial bus (USB) type wireless access devices may lack a user interface as they could piggyback onto the user interface of the host device to which they are physically and/or electrically coupled.

In the illustrated embodiment, the device includes a secure element 310 which contains and operates the eUICC application. The eUICC is capable of storing and accessing a plurality of access control clients, where the access control clients are configured to authenticate the user to a respective network. The secure element is accessible by the memory subsystem at the request of the processor subsystem. The secure element may also comprise a so-called "secure microprocessor" (SM) of the type well known in the security arts.

Furthermore, various realizations of the eUICC include an access module configured to establish a secure connection between the mobile device and a portal. In some embodiments, the eUICC can establish a secure connection to a portal, without the benefit of an existing eSIM, and even after the user equipment is deployed. In one variant, the device has a distinct asymmetric endorsement key pair which is separate from the symmetric key associated with any single eSIM (and the MNO issuing the eSIM).

In embodiments where the provisioning feedback mechanisms are implemented in whole or part on the client side of the network, the software and/or hardware necessary for implementing the provisioning feedback module 312 is executed in the protocol stack of the UE apparatus. Otherwise, the client device may operate as any other client device having the aforementioned electronic (eSIM) provisioning capabilities.

While the foregoing methods and apparatus for executing provisioning feedback mechanisms for access control clients are illustrated within the context of a cellular network, it is readily appreciated by those of ordinary skill, that other access control schemes and network types may be similarly substituted. For example, in other variants, the electronic identification components may be a distributed over a local area network, or personal area network.

SIM Provisioning Server (SPS)—

Figure 4:
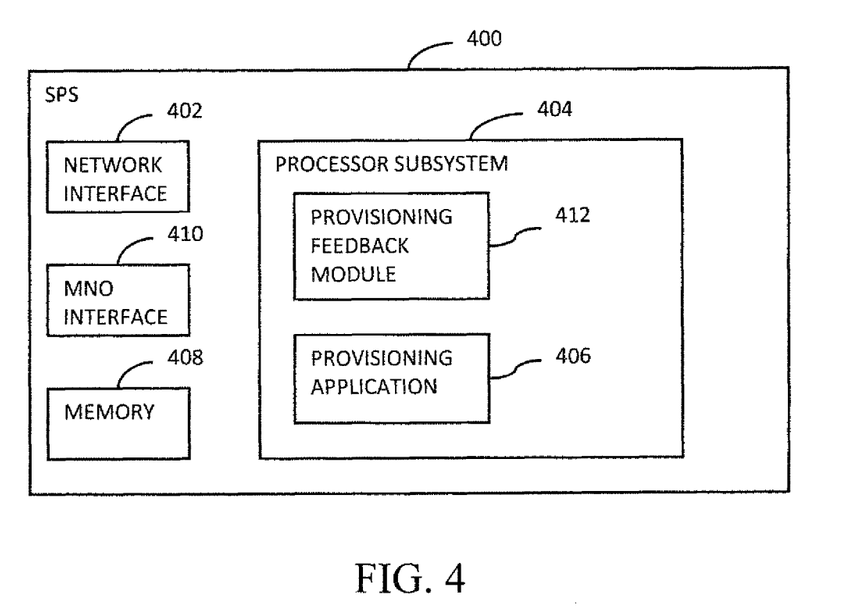
FIG. 4 is a block diagram of an exemplary embodiment of an SIM (Subscriber Identity Module) provisioning server (SPS) apparatus according to an embodiment.

FIG. 4 illustrates one exemplary embodiment of an SPS 400. The SPS may comprise a stand-alone entity, or may be disposed within a Trusted Service Manager (TSM) or other system, or assume yet other configurations. Common examples of TSMs include third-party SIM vendors, SIM resellers, etc. The TSM has a pre-established trust relationship with one or more Mobile Network Operators (MNOs). Accordingly, access to MNOs may be provided via the combination of the standalone SPS and/or TSMs (and associated SPS). In other words, the standalone SPS may be utilized for providing services and eSIMs to UEs on certain networks, while the TSM is utilized for providing services and eSIMs to UEs on other networks associated with the TSM. Various other schemes will be recognized by those of ordinary skill as well when provided this disclosure.

As shown in FIG. 4, the SPS 400 generally includes a network interface 402 for interfacing with a communications network, a processor subsystem 404, a storage apparatus 408, and various back end interfaces. Although an MNO interface 410 is illustrated, it is appreciated either or both of these may be omitted, replaced, or duplicated. Other interfaces may also be utilized, the foregoing being merely illustrative. The MNO interface enables the SPS to communicate with one or more MNOs.

In the illustrated embodiment, the SPS 400 includes a provisioning application 406 running on the processor subsystem 404 thereof. Although illustrated as a single application running on the SPS, it is appreciated that the foregoing provisioning functionality may comprise a distributed application running on a plurality of entities in data communication with one another. The provisioning application 406 receives communications from mobile devices, other trusted devices, client servers, etc., such as a communication requesting access to one or more eSIM stored thereon. The provisioning application 406 is also responsible for verifying the above requests to ensure these are received from authorized entities, and there are no security concerns. The provisioning application 406 may be further configured to store a database of available eSIMs. The database may provide information relating to the device and to each MNO associated to a particular eSIM. Additional information may be maintained as well. In one embodiment, the provisioning application 406 generates and stores the eSIM as well as the database. Alternatively, these may be generated elsewhere and merely received and stored at the SPS. Likewise, the provisioning application 406 may be used to update or change information stored in the database. The database, as well as the provisioning application 406 itself, may be stored at e.g., the storage entity 408 associated with the SPS.

In implementations where the feedback provisioning mechanisms are implemented on the server side of the network, the exemplary SPS will also include a provisioning feedback module 412 that implements the functionality discussed previously herein. The provisioning feedback module will, in an exemplary implementation, be executed on the processor subsystem and be in communication with the provisioning application discussed previously above.

Yet other types of SPS type architectures that may be used consistent with the present disclosure are described in U.S. patent application Ser. No. 13/093,722 filed on Apr. 25, 2011 and entitled "APPARATUS AND METHODS FOR STORING ELECTRONIC CLIENTS", Ser. No. 13/080,558 filed on Apr. 5, 2011 and entitled "APPARATUS AND METHODS FOR CONTROLLING DISTRIBUTION OF ELECTRONIC ACCESS CLIENTS", and Ser. No. 13/095,716 filed on Apr. 27, 2011 and entitled "APPARATUS AND METHODS FOR DISTRIBUTING AND STORING ELECTRONIC ACCESS CLIENTS", the contents of each of which are incorporated herein by reference in its entirety. For example, as described therein, certain eSIM distribution network infrastructures can be configured to enforce eSIM uniqueness and conservation, distribute network traffic to prevent "bottle necking" congestion, and provide reasonable disaster recovery capabilities. One exemplary network architecture comprises one or more electronic Universal Integrated Circuit Card (eUICC) appliances which ensure eSIM uniqueness and conservation, the access to the eUICC appliances is via multiple eSIM depots, which ensure that network load is distributed.

It will be recognized that while certain embodiments are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure as disclosed and claimed herein.

While the above detailed description has shown, described, and pointed out novel features as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the principles of the present disclosure. This description is in no way meant to be limiting, but rather should be taken as illustrative of the general principles of the disclosure. The scope of the disclosure should be determined with reference to the claims.

What is claimed is:

1. An electronic Subscriber Identity Module (eSIM) provisioning entity, comprising:
  a network interface; and
  a processor configured to cause the eSIM provisioning entity to:
    receive, from a mobile device, a first request for a first eSIM, wherein the first eSIM represents a virtualization of a physical SIM card, and the mobile device does not include a physical SIM card;
    verify that the first request is authorized;
    in response to verifying that the first request is authorized:
      provide, via the network interface, the first eSIM to the mobile device;
    receive, from the mobile device, a second request for a second eSIM; and
    in response to determining that the second request satisfies a threshold number of requests and is not authorized:
      execute a rate-limiting mechanism that causes the eSIM provisioning entity to ignore the second request for the second eSIM, and
      ignore subsequent requests for eSIMs received from the mobile device in accordance with a time period.

2. The eSIM provisioning entity of claim 1, further comprising a memory that is configured to store a plurality of eSIMs, wherein the first eSIM is retrieved from the plurality of eSIMs.

3. The eSIM provisioning entity of claim 1, wherein the time period corresponds to the mobile device.

4. The eSIM provisioning entity of claim 1, wherein the processor is configured to cause the eSIM provisioning entity to, subsequent the time period being satisfied:
receive an additional request for the second eSIM; and
in response to verifying that the additional request is authorized:
provide, via the network interface, the second eSIM to the mobile device.

5. The method of claim 1, wherein the mobile device is configured to, upon receipt of the first eSIM, store the first eSIM into a local memory that is accessible to the mobile device.

6. A method for provisioning electronic Subscriber Identity Modules (eSIMs), the method comprising:
at a provisioning entity:
receiving, from a mobile device, a request for a first eSIM, wherein the first eSIM represents a virtualization of a physical SIM card, and the mobile device does not include a physical SIM card;
in response to the request:
providing, to the mobile device, the first eSIM;
receiving, from the mobile device, an additional request for a second eSIM; and
in response to determining that the additional request satisfies a threshold number of requests:
executing a rate-limiting mechanism that causes the eSIM provisioning entity to ignore the additional request for the second eSIM, and
ignoring subsequent requests for eSIMs received from the mobile device in accordance with a time period.

7. The method of claim 6, wherein the time period corresponds to the mobile device.

8. The method of claim 6, wherein the rate-limiting mechanism further causes the provisioning entity to instantiate a penalty directed to a user of the mobile device.

9. The method of claim 6, further comprising, subsequent the time period being satisfied:
receiving another request for the second eSIM; and
providing the second eSIM to the mobile device.

10. The method of claim 6, wherein the provisioning entity has access to a memory in which a plurality of eSIMs are stored, and the first eSIM is retrieved from the plurality of eSIMs.

11. The method of claim 6, wherein the mobile device is configured to, upon receipt of the first eSIM, store the first eSIM into a local memory that is accessible to the mobile device.

12. A non-transitory computer readable storage medium configured to store instructions that, when executed by a processor included in a provisioning entity, cause the provisioning entity to carry out steps that include:
receiving, from a mobile device, a request for a first electronic Subscriber Identity Module (eSIM), wherein the first eSIM represents a virtualization of a physical SIM card, and the mobile device does not include a physical SIM card;
in response to the request:
providing, to the mobile device, the first eSIM;
receiving, from the mobile device, an additional request for a second eSIM; and
in response to determining that the additional request satisfies a threshold number of requests:
executing a rate-limiting mechanism that causes the eSIM provisioning entity to ignore the additional request for the second eSIM, and
ignoring subsequent requests for eSIMs received from the mobile device in accordance with a time period.

13. The non-transitory computer readable storage medium of claim 12, wherein the time period corresponds to the mobile device.

14. The non-transitory computer readable storage medium of claim 12, wherein the rate-limiting mechanism further causes the provisioning entity to instantiate a penalty directed to a user of the mobile device.

15. The non-transitory computer readable storage medium of claim 12, wherein the steps further include, subsequent the time period being satisfied:
receiving another request for the second eSIM; and
providing the second eSIM to the mobile device.

16. The non-transitory computer readable storage medium of claim 12, wherein the provisioning entity includes a memory that is configured to store a plurality of eSIMs that include the first eSIM.

17. The non-transitory computer readable storage medium of claim 12, wherein the mobile device is configured to, upon receipt of the first eSIM, store the first eSIM into a local memory that is accessible to the mobile device.

18. A method, comprising:
at an electronic Subscriber Identity Module (eSIM) provisioning server:
receiving, from a mobile device, a first request for a first eSIM, wherein the first eSIM represents a virtualization of a physical SIM card, and the mobile device does not include a physical SIM card;
verifying that the first request is authorized;
in response to verifying that the first request is authorized:
providing, via a network interface included in the eSIM provisioning server, the first eSIM to the mobile device;
receiving, from the mobile device, a second request for a second eSIM; and
in response to determining that the second request satisfies a threshold number of requests and is not authorized:
executing a rate-limiting mechanism that causes the eSIM provisioning server to ignore the second request for the second eSIM, and
ignoring subsequent requests for eSIMs received from the mobile device in accordance with a time period.

19. The method of claim 18, further comprising, subsequent to the time period being satisfied:
receiving an additional request for the second eSIM; and
in response to verifying that the additional request is authorized:
providing, via the network interface, the second eSIM to the mobile device.

20. The method of claim 19, further comprising, prior to providing the first eSIM to the mobile device:
obtaining the first eSIM from a memory that is accessible to the eSIM provisioning server, wherein the memory is configured to store a plurality of eSIMs in which the first eSIM is included.

* * * * *